INVENTORS
ROBERT J. S. BROWN
BERNARD W. GAMSON

ATTORNEYS

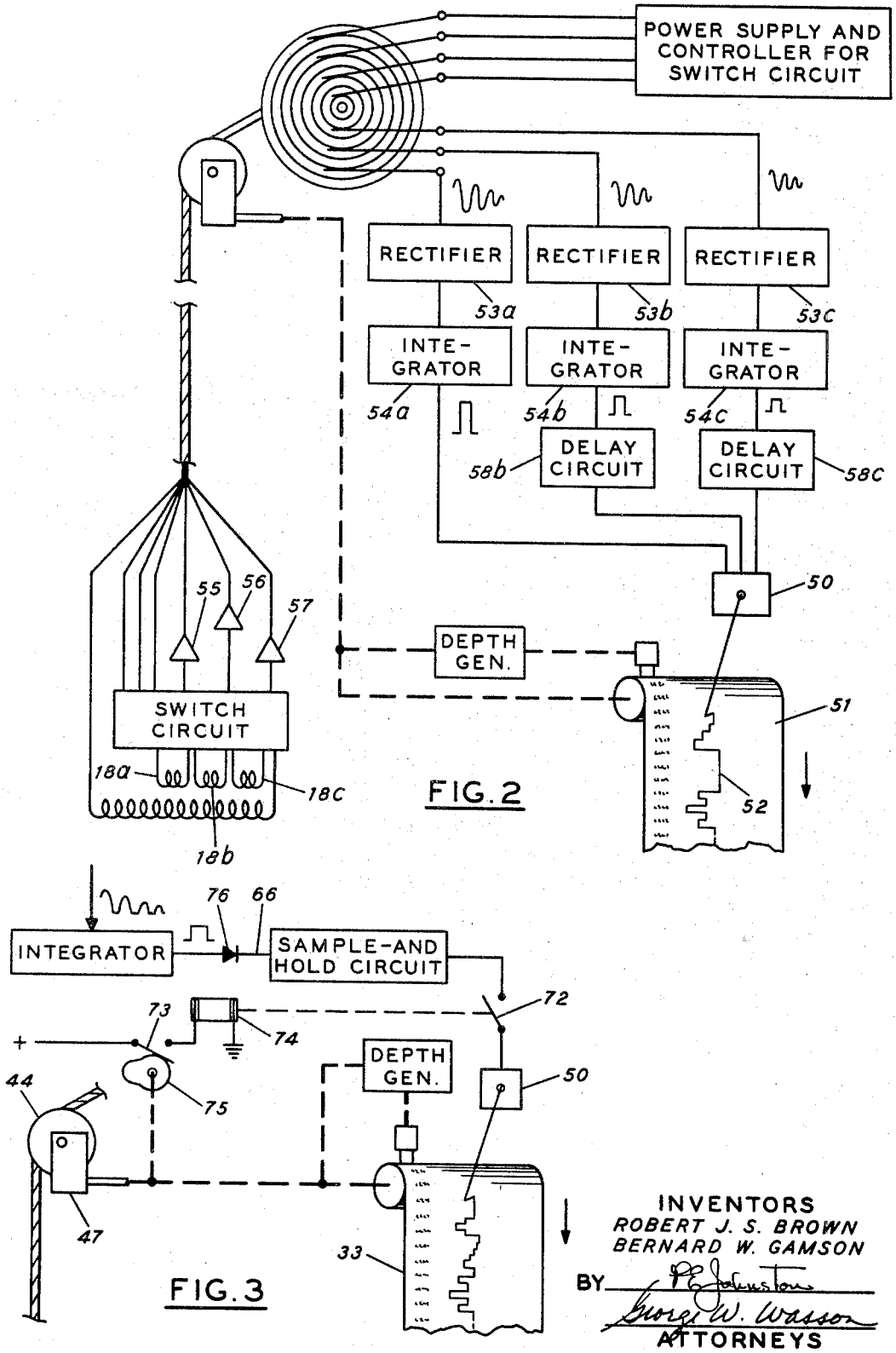

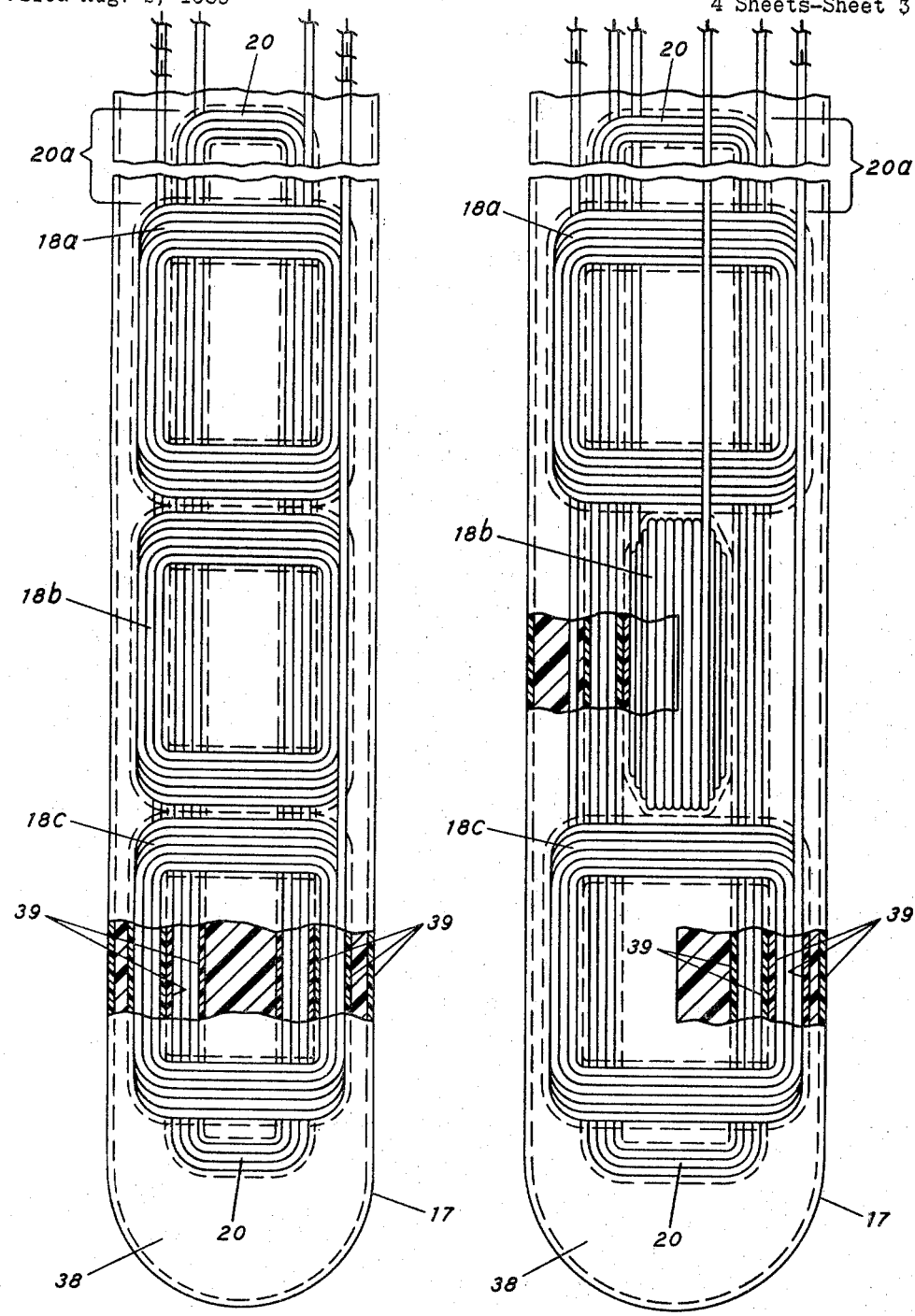

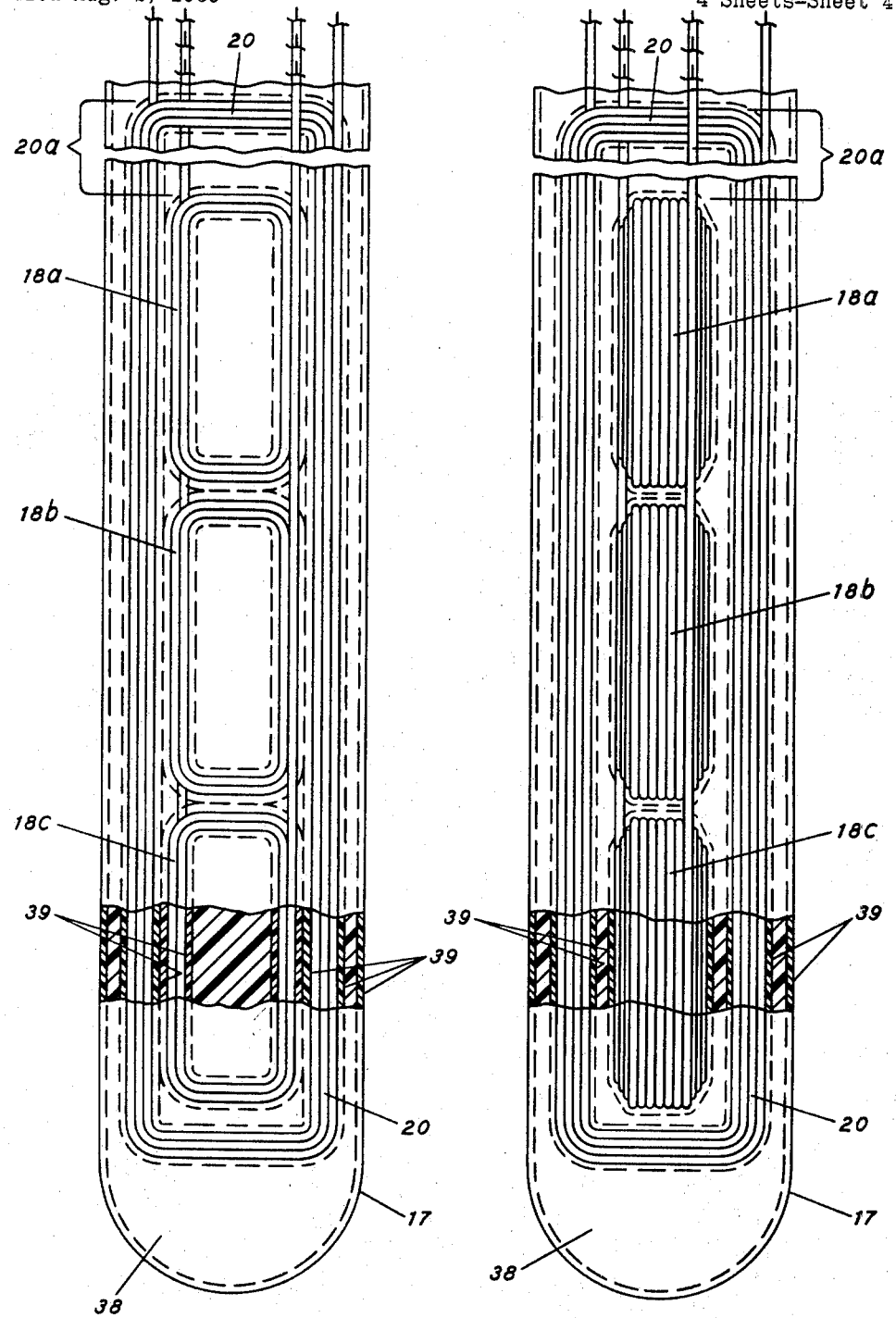

United States Patent Office 3,402,343
Patented Sept. 17, 1968

3,402,343
HIGH SPEED, HIGH RESOLUTION, NUCLEAR MAGNETISM WELL LOGGING APPARATUS HAVING A PLURALITY OF RECEIVING COILS AND AN EXTENDED POLARIZING COIL, AND METHOD FOR USING SAME
Robert J. S. Brown, Fullerton, and Bernard W. Gamson, Los Angeles, Calif., assignors, by direct and mesne assignments, to Chevron Research Company, San Francisco, Calif., a corporation of Delaware
Continuation-in-part of application Ser. No. 387,569, Aug. 5, 1964. This applicaation Aug. 2, 1965, Ser. No. 476,279
5 Claims. (Cl. 324—.5)

ABSTRACT OF THE DISCLOSURE

Statistical reliability and vertical resolution of a nuclear magnetism log originating from nuclear magnetism signals from fluids in an earth formation traversed by a well bore and polarized and received by a nuclear magnetism logging system within the sonde, is improved by relating only those precessing atomic nuclei from each depth interval of formation adjacent to each of a plurality of end-to-end arranged receiving coils. The receiving coils are arranged coextensive with the polarizing coil such that the polarizing coil has an effective portion of its windings extending along the well bore substantially further than the plurality of receiving coils, the extension being in the direction of which the sonde travels and being at least equal to the product $VT_0$ where V is the velocity of the traversing sonde and $T_0$ is the polarizing time of the protons of the formation being logged.

---

This application is a continuation-in-part of application Ser. No. 387,569, filed Aug. 5, 1964, now abandoned.

The present invention relates to a nuclear magnetism well logging and, more particularly, to a method and apparatus to improve statistical reliability and vertical resolution of a nuclear magnetism log originating from nuclear magnetism signals from fluids in earth formations traversed by a well bore and detected by a receiving system in a logging sonde as the sonde is continuously drawn through the well bore.

It is the primary object of this invention to improve the statistical reliability and vertical resolution of such a logging record by relating only those precessing atomic nuclei from each depth interval adjacent to each of a plurality of end-to-end arranged receiving coils, say for example N coils where N is any number greater than one, and to process the nuclear magnetic signals derived from the precessing nuclei so they may be recorded on a recording medium as a function of depth along the well bore. Each receiving coil is simultaneously affected by the precession of polarized atomic nuclei as all of the N coils move continuously through the well bore. Thus, in order that the signals induced in each coil may be permanently recorded as a function of a corresponding depth interval, the signals originating from $N-1$ coils are either electrically or mechanically processed prior to recording to provide appropriate delay intervals. In this way, the resulting logging record depicts only those signals received by the coil adjacent to the corresponding depth interval depicted on the recording medium. Thus, the vertical resolution of the total record is much greater than that of conventional receiving systems since each depth interval relates only to the total length of each coil (not the sum of all receiving coils); and small bedding intervals within the formation containing polarizable atomic nuclei are more easily recognized from the logging record. The statistical reliability of such a log is also increased over those of conventional logging systems inasmuch as the signals recorded on the logging record relate only to a given depth interval equal in length to that of each receiving coil. Hence there is less likelihood of averaging the signals of contiguous but geologically differing bedding intervals.

In detecting fluid in earth formations using nuclear magnetism well logging techniques, a logging sonde is placed within a well bore penetrating formations having strong likelihood of oil deposits. As the sonde is placed adjacent to particular portions of the borehole, the sonde generates and detects nuclear magnetic signals from fluid in and around the borehole. In establishing and detecting the nuclear magnetic signals, the protons of the hydrogen atoms of the fluids—either water or hydrocarbons—are first aligned with a strong polarizing field and then permitted to relax toward alignment with the second field, usually the earth's magnetic field. The protons act as small gyroscopes and precess about the direction of the second field. The precessing of the protons establishes a rotating magnetic field detectable by a receiving coil through the generation of a signal. The signal is transmitted to a recording device at the surface of the earth. Relaxation of the protons can be measured from the signals transmitted to the recording device.

It is highly desirable in well logging to move the sonde continuously through the well bore. This is primarily because each stop during polarization of the earth formation increases the time that the drilling equipment is tied up. One of the most important costs of any well logging operation is that resulting from interfering with the operations of the drilling rig and particularly tying up the skilled labor required to run such a rig. Hence prolonged tests are not often made in wells. Furthermore, in the case of a freshly drilled borehole, especially where the formations are soft, there is also an additional danger that the logging instrument may become stuck when stopped in the well bore. The removal of such a stuck tool is also an expensive operation.

In order to improve the speed with which a given well may be logged by a nuclear magnetism logging tool, we have previously disclosed and claimed modifications to the logging tool in which the polarizing coil is formed with an extended portion beyond the receiving coil in the direction of travel of the logging sonde (Nuclear Magnetism Well Logging Method and Apparatus, Robert J. S. Brown and Bernard W. Gamson, Ser. No. 387,569, filed Aug. 5, 1964, now abandoned). In accordance with the improved logging sonde construction described in the above-mentioned application, the protons of the formation fluids are exposed to the polarizing field for a full desirable polarizing time prior to the arrival of the detection coil irrespective of the fact that both the polarizing and the detection coils are continuously moving along the well bore. Hence the logging tool may be continuously drawn through a well bore at a relatively high rate of speed, and the time required to log the well is correspondingly decreased without a decrease in initial nuclear magnetism signal intensity.

It has been recognized in the logging art that the speed of logging can also be increased by merely increasing the length of the receiving coil to reduce the total number of readings required to log a given well or a given depth interval of that well. But, as the length of the receiving coil is increased, each reading now arepresents several feet of the earth formation. The effect is that the record is an average of signals from a section of the earth traverse during each receiving interval, and represents a given range of depth that may include many different kinds of earth formations. Usually, an operator wishes to use nuclear magnetism well logging to identify rather small changes in earth formations; as, for example, a change in its fluid content within a vertical distance of the order of a foot. To get such resolution with previous logging devices, it would be necessary to stop the logging tool every foot or so when using conventional "long" receiving coils or to log the formation with a receiving coil no more than one foot in length at rather slow speeds. Neither of these alternatives is considered commercially feasible.

In accordance with the present invention, the resolution of a nuclear magnetism logging record is improved without sacrificing logging speed by increasing the number of receiving coils used to detect the precessing protons of the earth formation. Preferably, these coils are located in an array along the axis of the well bore co-extensive with a portion of the polarizing coil and have ends separately connected to a recorder at the surface of the earth. Since the signal response induced on each coil is directly relatable to a given depth interval equal to only the vertical length of each detecting coil when these individual signals are appropriately recorded, the resulting logging record has relatively high resolution.

In addition to the improved resolution, the logging speed with which the coils traverse a given well is maximized in accordance with present method and apparatus by having the total length of the coils relatively long. Thus, only a minimum number of readings are required to log the well. Suitably, the number of coils to be used may be three or more; but the improvement gained in accordance with this invention can be accomplished by employing any number of coils greater than one.

Inasmuch as the coils must be placed in an axial array along the well bore, a practical limit of the number of coils is that number that can be conveniently fitted into the coil portion of a logging sonde. A convenient number of coils is three and the total length of each coil is preferably one foot. In addition, to assure all protons of the formation are polarized a full desirable polarizing time before precession is initiated, the polarizing coil preferably includes an extension portion extending beyond the forward end of the leading coil in the coil array. If the coil with its extension is energized to accomplish polarization which the tool is moved through the well bore all protons will now be polarized a full desirable polarizing time prior to the time that precession is initiated and signals are detected. In a preferred embodiment, the length of the extension is equal to the product $VT_0$ in the forward direction, where V is the velocity of the sonde and $T_0$ is the time required to accomplish the desired polarization of the formation fluids. The designation "forward" is with respect to the direction of travel of the logging sonde.

Further, in accordance with the present invention, the detected nuclear magnetic signals may be sequentially recorded in analogue form by means of a multichannel recorder in which the reproducing heads are spaced along the record distances proportionate to the length separating each receiving coil. Alternatively, a single-channel recorder may be used to provide a single-line record of the signals if delay circuits are provided between each of the coils and the recorder so that cumulative delays are provided between the first and the last coil. In single-channel recording, the signals from successive receiving coils are individually delayed before being supplied to the recorder head. To provide appropriate timing delays, the delay circuits are interconnected between the appropriate coils and the recorder and are preferably composed of passive-elemented delay lines in which the delay lines include a gated feedback loop to provide the required delay intervals needed in logging operations. The delay can also be provided by a closed-loop magnetic recorder connected in like manner to the detection coils in which the reproducing heads are spaced along the record distances equivalent to the length of each detection coil. In that manner, the signals from such coils can be seen to be delayed predetermined time periods equal to the time required for each rearward coil to travel from its initial detection position to that position initially occupied by the forward coil when the polarizing current is terminated. This condition must occur irrespective of whether a single or multiple channel recording of the signals is desired.

Further objects and advantages of the present invention will become apparent from the following description when taken in conjunction with the accompanying drawings, in which:

FIGURE 2 is an alternative embodiment of the apparatus of FIGURE 1 wherein circuit elements are included to transform, shape, and delay the nuclear magnetism signals originating from the rearward receiving coils, as indicated by the direction of travel of the logging sonde;

FIGURE 3 is a detail of a delay circuit of the embodiment of FIGURE 2;

FIGURES 5–8 are side elevations of alternative configurations of receiving and polarizing coils of the logging sonde of FIGURE 1.

Figures 1, 4:
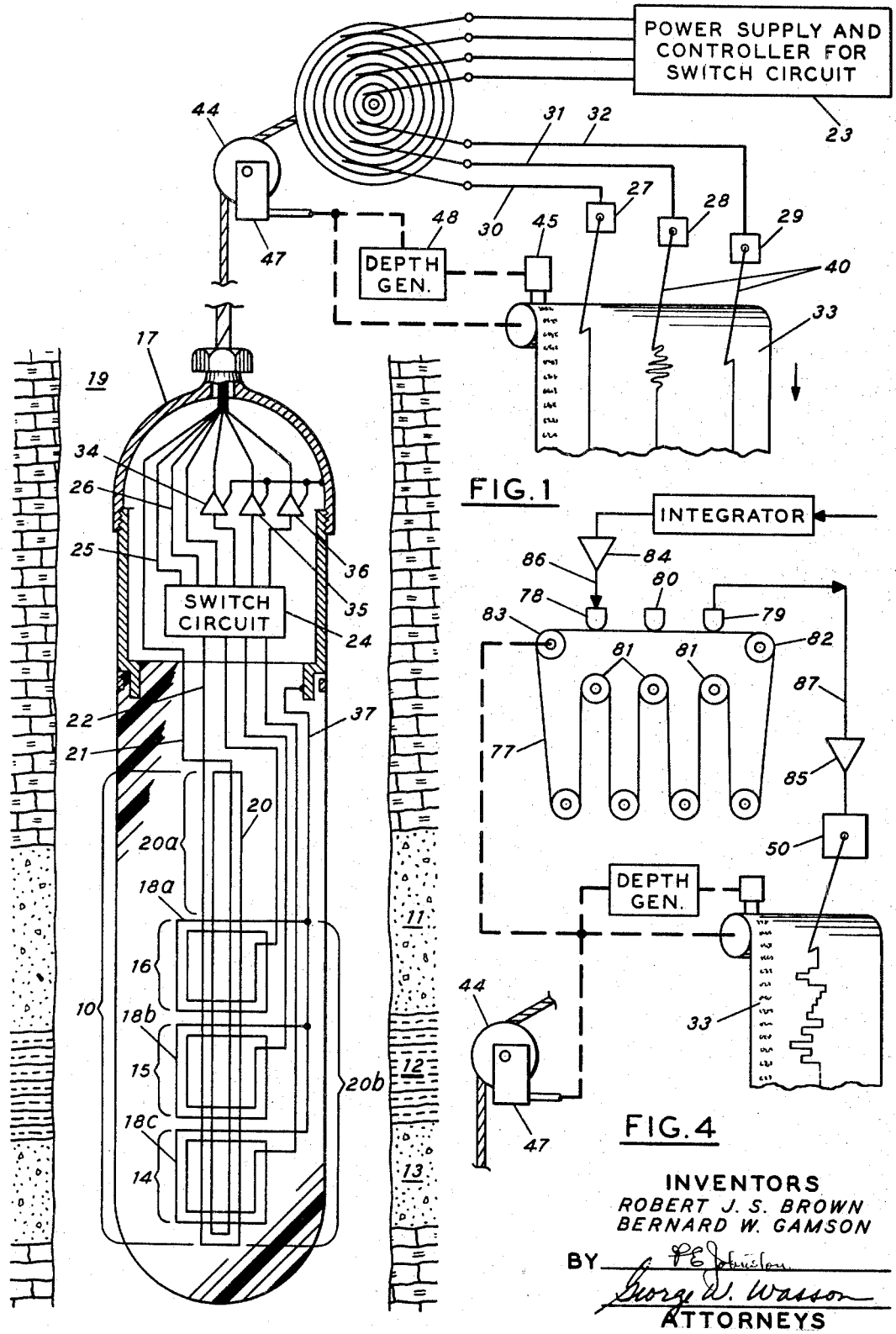
FIGURE 1 is a schematic representation of the well logging sonde attached to generate, detect and record nuclear magnetism signals originating from intervals of an earth formation, such signals being detected by a plurality of receiving coils aligned in an axial array along the well bore penetrating such a formation in the practice of the method in accordance with the present invention.
FIGURE 4 is an alternative delay circuit.

Reference is now made to the drawings and, in particular to FIGURE 1. The well logging method of this invention is illustrated as applied to a system for investigating the materials along a rather lengthy depth interval 10 having a series of earth formation strata 11, 12 and 13. The investigation is accomplished by detecting precession signals from polarized protons in fluids within shorter substantially equal length depth intervals 14, 15 and 16. The intent of the present method of investigation is to detect strata changes in such formations in short intervals, say one foot, even though the strata or formation thickness may be many times larger than the short intervals. The investigation is accomplished by continuously moving a sonde 17 along the well bore 19 while detecting signals induced in the receiving coils 18a, 18b and 18c, as explained more fully below. The improvement in the resolution of the resulting logging record will be apparent from the following description of the sonde and its operation.

Generation of the polarization magnetic field along the depth interval 10 is accomplished by periodically passing current through polarizing coil 20 via conductors 21 and 22. Equipment enclosure 23, uphole from the sonde, houses a current source and a timing controller to provide and control the polarizing current. The polarizing duration preferably corresponds to the polarizing period of the protons of the formation fluids and, in practice, is usually rather long, say four seconds. The receiving coils 18a, 18b and 18c are not designed to carry the polarizing current; thus, during the polarizing interval, switch circuit 24, housed in the sonde, must couple the polarizing current to polarize coil 20 but isolate the current from the receiving coils 18a, 18b and 18c for a relatively long time period. Switch circuit 24 preferably is of the relay type to provide the needed reliability and includes corresponding plurality of contacts individually operated through conductors 25 and 26 connected to the controller in enclosure 23.

In the subsequent detection cycle, the controller terminates the polarizing current. Switch 24 reverses operating states to connect the receiving coils 18a, 18b and 18c to galvanometers 27, 28 and 29 through conductors 30, 31 and 32 while isolating the galvanometers from the polarizing coil.

The signal voltages induced into the receiving coils by precessing protons within the depth intervals 14, 15 and 16 are reproduced on strip record 33. The amplitude of the signals is proportional to the number of protons within the depth interval adjacent to each coil. The resulting record of such signals may then be interpreted to identify the presence of fluids, such as crude oil, in the formation.

In more particular detail, polarizing coil 20, as indicated in FIGURE 5, is preferably formed of a single strand of insulated conducting wire wound in a series of rectangular turns. The long side of each of such turns is disposed within the sonde parallel to the side wall of the well bore so that the magnetic field generated by current flow through the coil has lines of force that enter the formation and have substantial components normal to the earth's magnetic field. All of the turns are supported in a bundle (to maximize field penetration and to ease assembly) in contact with each other along both the longer sides and the shorter sides of the coil. In the direction of travel of the logging sonde, the longer sides of the polarizing coil may extend beyond the leading detection coil—i.e., coil 18a as viewed—to define an upper extension 20a. With this construction, a more complete polarization of all protons of the formation fluids is accomplished before precession is initiated.

The signals of each coil are separately coupled through amplifiers 34, 35 and 36 to the galvanometers and represent the number of protons existing in the depth intervals 14, 15 and 16 adjacent to respective receiving coils 18a, 18b and 18c. Thus, if free protons only exist in depth interval 15, the resulting record 33 would present signal variation as a function of time only on that portion of the record recorded by galvanometer 28. The resulting logging record thus provides better vertical resolution and statistical reliability.

In order to maximize sensitivity, the receiving coils are located within the lower projection 20b of the polarizing coil 20. The coils comprise a series of rectangular windings formed of a single strand of insulated conductor. One end of the coiled conductors attaches through one segment of switch circuit 24 to amplifiers 34, 35 and 36 and then to galvanometers 27, 28 and 29. The other end of each of the coils is then connected to ground through conductor 37 and the housing of the sonde 17.

The position of the receiving coils, with respect to the axis of the sonde, may vary with the environmental requirements of each logging operation. A nonexclusive listing of permissible variation in coil configurations includes the following:

(1) In FIGURE 5, the receiving coils are eccentrically disposed within the polarizing coil so that the effective portions of each receiving coil are exterior to, but aligned with, the long sides of the polarizing coil. (The long sides of each turn determine the effectiveness of the receiving coil and are referred to as the effective portions of the coil.) Thus, the magnetic axes of the coils are parallel to each other (but not aligned) and are normal to the logging sonde. Connection of the pair of long sides of each turn by the short sides is along arcuate paths located on the exterior surface of the polarizing coil. Support to the receiving and polarizing coils is provided by an epoxy-resin housing 38 forming the lower projection of the sonde 17. The housing may be of unitary construction but preferably includes segmented elements to aid in assembly of the coils. Each coil, for example, may include separately formed shrouds 39 co-extensive with, and attached to, the exposed surfaces, with additional material later being added after assembly to increase the rigidity and strength of the housing. It has been found that this configuration increases detection sensitivity since the receiving coils are positioned in close alignment with the side wall of the well bore.

(2) In FIGURE 6, the receiving coils are eccentrically disposed within the polarizing coil, but the effective portions of the receiving coils are positioned in vertical alignment with and adjacent to the long sides of the polarizing coil. The magnetic axes of the coils remain the same as FIGURE 5: parallel to each other and normal to the axis of the sonde. Magnetic lines of force thus penetrate maximum distance from the axis of the sonde since the polarizing coil is positioned in close alignment with the geological formations exterior of the well bore.

(3) In FIGURE 7, the polarizing and receiving coils are both positioned in close alignment with the side wall of the well bore by the circumferential spacing of the long sides of both sets of coils 90 degrees from one another. In that manner, a plane passing through the vertical axis of the sonde, as shown in the figures, and long sides of the receiving coils, is normal to a like plane also passing through the same axis of the sonde and long sides of the polarizing coil. Even though the effective portions of the coils remain parallel, their magnetic axes are normal to each other, as well as normal to the logging sonde. The short sides of the coils are preferably equal. Thus, the distances between the two long sides of each receiving coil, and those of the polarizing coil, are also equal. With this construction, the detection sensitivity, as well as the magnitude of the lateral penetration of the generated magnetic field, are both maximized (if the earth's field is somewhat nearly parallel with the borehole).

(4) In FIGURE 8, the receiving coils are asymmetrically located relative to each other to prevent cross-coupling of the signals induced into respective adjacent coils. As indicated, the forward and rearward coils 18a and 18c may be disposed with their effective portions vertically aligned with the long sides of the polarizing coil so that a plane passing through the axis of the sonde and the long sides of these coils also passes through the long sides of the polarizing coil. Thus, magnetic axes of these coils are parallel to one another and normal to the sonde 17. But the intermediately disposed coil 18b has long sides circumferentially spaced 90 degrees with respect to both the long sides of the coils 18a and 18c and polarizing coil 20 so that a plane passing through the axis of the sonde and the long sides of the coil 18b is normal to a like plane passing through the axes of symmetry and the long sides of the other coils. Thus, the magnetic axis of coil 18b is normal to both coils 18a and 18c and polarizing coil 20. The short sides of the coils are preferably equal in length so that detection sensitivity is matched. Orientation of the leading and trailing receiving coils can, of course, be varied with respect to the position of the polarizing coil without departure from the present invention. For example, coils 18a and 18c may be located so that their long sides are not vertically aligned with the long sides of the polarizing coil but, instead, are circumferentially spaced 90 degrees therefrom so that their magnetic axes are normal to that of the polarizing coil. To provide corresponding realignment, the intermediate coil 18b would be oriented with its long sides vertically aligned with the long sides of the polarizing coil with its magnetic axis parallel with that of the polarizing coil.

Permanent recording of the nuclear magnetism signals at each observation can be achieved in either continuous (analogue) or pulse waveform. The character of the waveform depends only on the type of printer and processing circuits used in conjunction with the logging record.

To provide analogue recording, the printer preferably consists of the galvanometers 27, 28 and 29 of FIGURE 1 previously described. To synchronize the signal response of each receiving coil with a corresponding depth interval, the styli 40 of the galvanometers 28 and 29, serially connected to the rearward detection coils 18b and 18c, are initially offset in relation to their points of contact with strip record 33. The magnitude of the offset is dependent only on the length of the coils and, moreover, is independent of the rate of which the sonde traverses the well bore.

To produce a continuous log of the well, the strip record 33 is continuously driven past each stylus by cable sheave 44. Depth marks are printed along the left-hand edge of the record as viewed through printer 45 which responds to the rotation of the sheave 44 through gear-reducer 47 and depth generator 48.

FIGURE 2 illustrates an alternative arrangement to interconnect the receiving coils 18a, 18b and 18c to a single galvanometer 50 to provide a single-channel logging record 51. The waveform of line 52 printed on the record is not continuously oscillating over the vertical scale of the record as in FIGURE 1 but is composed of a single pulse whose amplitude represents the strength of the nuclear magnetism signals derived by a corresponding receiving coil. The conversion of the oscillating nuclear magnetism signals to pulse form is achieved by means of rectifiers 53a, 53b and 53c and modified integrators 54a, 54b and 54c interconnected between galvanometer 50 and respective analogue amplifiers 55, 56 and 57. In operation, the integrators damp the trailing edge of respective pulses so that the upper segment of the leading edge of the following pulse, if there should be one, can be recorded and the amplitude of the pulse measured.

To synchronize the pulses with appropriate depth markings of the record, the pulses of the receiving coils 18b and 18c are delayed predetermined time intervals by sample-and-hold circuits 58b and 58c connected, as shown, between integrators 54b and 54c and galvanometer 50. With particular reference to FIGURE 3, each sample-and-hold circuit preferably includes one or more charging capacitors alternately connected to the integrator circuits through a switch or other gating element synchronizing the delay periods for the signals with relative movement of the logging sonde (see, for example, "Computer Handbook," Huskey & Korn, McGraw-Hill, New York, 1962 at Section 3). To switch a delayed pulse to the galvanometer 50, the output of the sample-and-hold circuit is closed at predetermined intervals (as by switch 72, as shown) through the operation of pulsing switch 73 and relay 74. Cam 75 operates the pulsing switch 73 to energize the relay 74. The cam 75 is synchronized with the position of the logging sonde through the gear reducer 47 coupled to cable sheave 44. Pulsing switch 73 closes each time the cable moves along the well bore a predetermined distance; i.e., the distance required for a rearward coil 18b or 18c to travel from its initial position to that position initially occupied by the forward coil 18a at the beginning of the detection cycle. Thus, independently of the rate of which the sonde cable is reeled in, the galvanometer 50 receives and prints out the pulses as corresponding depth markings are printed on the strip record 33.

The delay interval of each pulse may vary from say 20 milliseconds to rather long intervals, say 5000 milliseconds. Thus, during the delay period, downhole switch circuit 24 may change operating states to again allow current to pass through the polarizing coil. To prevent such changes in operating state from affecting the impedance of the sample-and-hold circuit, rectifier 76 is inserted between the integrator and input line 66 as shown.

FIGURE 4 illustrates an alternate delay circuit to provide integration of sonde speed with the duration of pulse delay. In this circuit, the incoming pulse is recorded on endless magnetic tape 77 by recording head 78. Tape 77 travels in a closed loop between recording head 78, reproducing head 79 and erasing head 80. A plurality of idler rollers 81, positioned between drive roller 82 and driven roller 83, guide the tape. The speed of the tape is synchronized with the rate of travel of the sonde by mechanically linking the shaft of the drive roller to the cable sheave 44 through gear reducer 47. Amplifiers 84 and 85 are serially connected at the input and output lines 86 and 87, respectively, of the recorder; each has an oppositely oriented frequency response characteristic so that the over-all frequency response of the recorder is flat, as is well known in the art. Thus, independently of the rate of travel of the sonde, the galvanometer 50 receives the pulse corresponding to a given depth interval adjacent the rearward coils at the correct depth markings printed on the record 33.

Various modifications and changes in both the method and apparatus will occur to those skilled in the art, and such modifications and changes falling within the scope of the appended claims are intended to be included therein.

We claim:
1. Apparatus for increasing the resolution of a nuclear magnetism logging record of an earth formation penetrated by a well bore and traversed by a logging sonde, comprising:
    (a) a polarizing coil housed in said sonde to polarize said earth formation over an extended region thereof for a predetermined time interval;
    (b) a plurality of receiving coils located in an end-to-end axial array along said well bore co-extensive with said polarizing coil to receive nuclear magnetism signals from adjacent substantially smaller depth intervals within said polarized region of said earth formation, after said polarizing coil is de-energized, each of said depth intervals being about equal in length to respective adjacently located receiving coils;
    (c) said polarizing coil having an effective portion of its windings extending along said well bore substantially farther than said plurality of receiving coils, said extension along said well bore being in the direction which said sonde travels in the logging operation and being at least equal to the product $VT_o$, where V is the velocity of the traversing sonde and $T_o$ is the polarizing time of the protons of the adjacent earth formation;
    (d) means for recording said nuclear magnetic signals to provide a logging record of said signals as a function of said predetermined depth intervals; and
    (e) means connecting said plurality of receiving coils to said recording means.

2. Method of improving the reliability and resolution of a nuclear magnetic logging record of an earth formation penetrated by a well bore and traversed by a logging sonde, which comprises the steps of:
    (a) positioning a plurality of receiving coils within said well bore in an end-to-end axial array along the axis of said well bore;
    (b) simultaneously positioning a polarizing coil within said well bore, said polarizing coil co-extensive of said plurality of receiving coils and having at least an effective portion of its windings extending substantially farther than said receiving coils in a direction which said logging sonde is to travel in logging said formation;
    (c) traversing said coils through said well bore at a velocity not more than the quotient of $L/T_o$, where L is the length of said extension of said polarizing coil and $T_o$ is the polarizing time of the protons of said formation;
    (d) applying a polarizing current to said polarizing coil for said polarizing time to generate a magnetic field over an extended region of said earth formation so that all protons within a smaller portion of said extended region are polarized the full polarizing time;
    (e) interrupting said polarizing current;
    (f) positioning said receiving coils adjacent to said smaller portion to detect the inphase nuclear magnetic signals of protons therein; and
    (g) recording said signals by connecting each of said plurality of receiving coils to recording means to thereby provide a record of said signals relatable to formation depth intervals within said smaller portion of said extended region.

3. Method of improving the reliability and resolution of a nuclear magnetic logging record of an earth formation penetrated by a well bore and traversed by a logging sonde, which comprises the steps of:
 (a) positioning a plurality of receiving coils within said well bore in an end-to-end axial array along the axis of said well bore;
 (b) positioning a polarizing coil within said well bore, said polarizing coil co-extensive with said plurality of receiving coils and having at least an effective portion of its windings extending substantially farther than said receiving coils in a direction which said logging sonde is to travel in logging said formation;
 (c) continuously traversing said coils through said well bore at a velocity equal to the quotient of the length of the said extension divided by the polarizing time of protons of said earth formation;
 (d) cyclically applying a polarizing current to said polarizing coil for the duration of the polarizing time of said protons to generate a magnetic field over an extended region of said earth formation so that all protons within a preselected portion of said extended region are polarized a full polarizing time;
 (e) interrupting said polarizing current;
 (f) positioning said receiving coils adjacent to said preselected portion of said extended region to detect the inphase nuclear magnetic signals of protons therein, the cycling period for said polarizing current being at least the sum of the time required to polarize said protons and to detect the inphase precession thereof; and
 (g) recording said signals to provide a logging record relatable to depth intervals within said preselected portion of said extended region, said intervals being defined by the length of said receiving coils at the time detection of said signals occurs.

4. Method of claim 3 in which said step of recording said nuclear magnetism signals includes delaying said signals predetermined but differing time intervals prior to recording.

5. Method of claim 3 in which said step of recording said nuclear magnetism signals includes delaying said signals from $N-1$ receiving coils predetermined but differing time intervals prior to recording, where N is the total number of receiving coils and is equal to any whole number greater than one.

References Cited

UNITED STATES PATENTS

| | | | |
|---|---|---|---|
| 2,436,503 | 2/1948 | Cleveland | 324—1 |
| 3,213,354 | 10/1965 | Baker | 324—0.5 |
| 3,250,986 | 5/1966 | McKay | 324—0.5 |

RUDOLPH V. ROLINEC, *Primary Examiner.*

M. J. LYNCH, *Assistant Examiner.*